United States Patent
Takeda et al.

[15] 3,665,325
[45] May 23, 1972

[54] VOLTAGE COMPARATOR

[72] Inventors: Ikuo Takeda; Takashi Suzuki, both of Tokyo, Japan

[73] Assignee: Takeda Riken Industry Company Limited, Tokyo, Japan

[22] Filed: July 8, 1969

[21] Appl. No.: 839,892

[30] Foreign Application Priority Data

July 10, 1968 Japan.................................43/47789

[52] U.S. Cl..............................328/146, 307/220, 307/235, 328/127, 340/347
[51] Int. Cl. ........................................................G06g 7/14
[58] Field of Search..........................340/347; 307/235, 220; 328/146, 127

[56] References Cited

UNITED STATES PATENTS

| | | | |
|---|---|---|---|
| 3,255,446 | 6/1966 | Emmerich | 340/347 |
| 3,430,227 | 2/1969 | Hillis | 340/347 |
| 3,458,809 | 7/1969 | Dorey | 324/99 |
| 3,462,758 | 8/1969 | Reynal | 340/347 |

*Primary Examiner*—John S. Heyman
*Assistant Examiner*—David M. Carter
*Attorney*—William J. Daniel

[57] ABSTRACT

This invention relates to a voltage comparator of a high resolving power and high accuracy wherein an input voltage and a reference voltage are respectively integrated to indicate as a digital quantity the ratio of times required for the integrated values to become proper equal values, an analog value corresponding with this digital quantity is an then multiplied by the reference voltage to obtain an analog error voltage, the difference between said error voltage and the reference voltage is amplified by a scaling factor, and said amplified error voltage is again integrated against a reference voltage to obtain a second ratio of times represented by a digital quantity and these two digital quantities representing said ratios of times are synthesized to provide most-significant digits and least-significant digits interrelated by said scaling factor to represent the input voltage as compared with the reference voltage.

1 Claims, 1 Drawing Figure

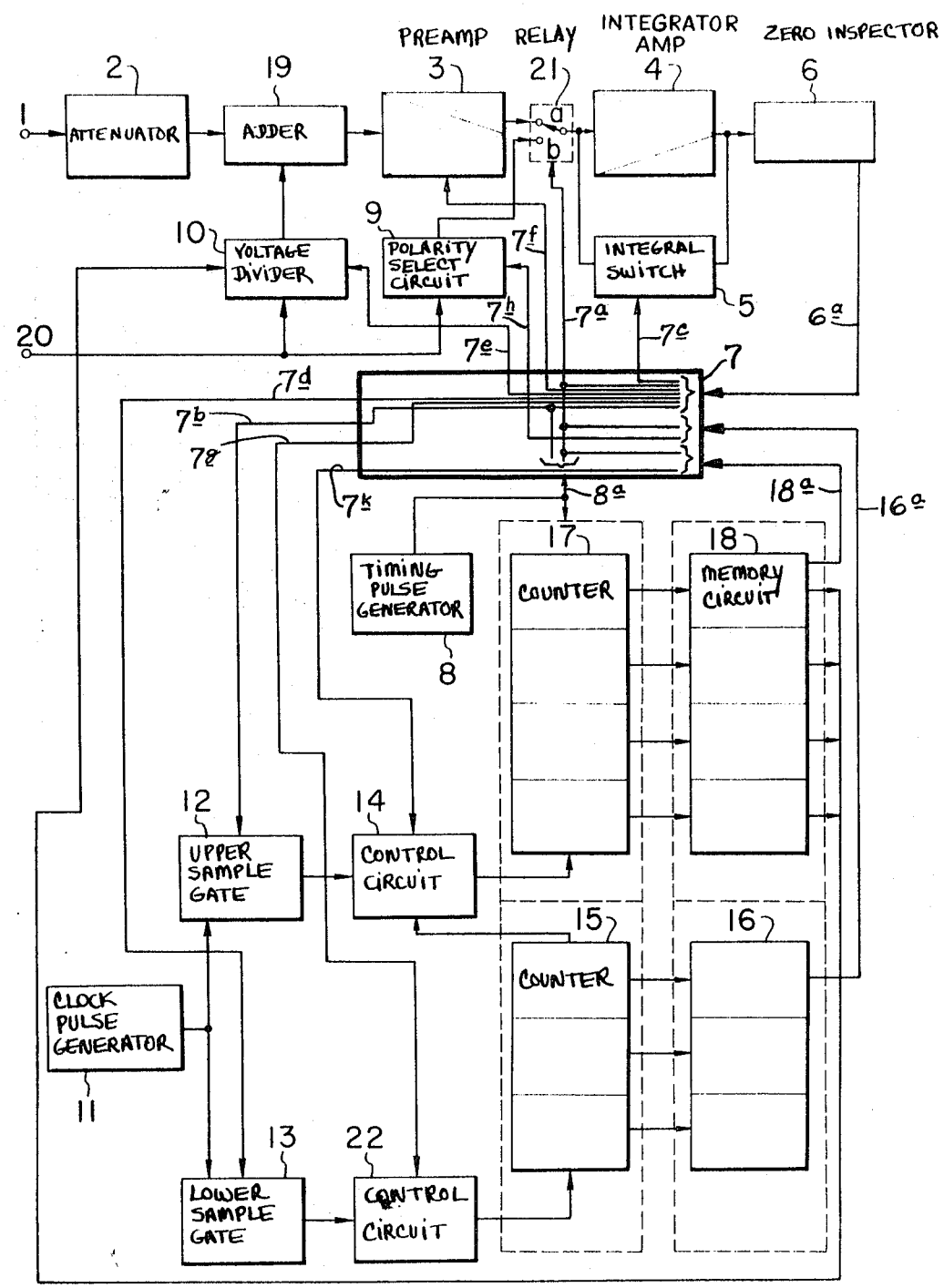

VOLTAGE COMPARATOR

This invention relates to an apparatus for carrying out a precise digital measurement of a voltage, for example, by comparing a voltage to be measured with a reference voltage.

As digital voltage measuring apparatus, there is a comparing type and an integrating type. In the former, due to the influence of noises, no precise measurement can be made. In the latter, such defect is eliminated. There is one integrating type system wherein a voltage to be measured is applied to an integrator and, whenever the output voltage reaches a fixed value, a fixed quantity of electric charge is fed back to the input terminal of the above mentioned integrator to generate repeated pulses proportional to the input voltage, and these pulses are then counted. There is another integrating system wherein a voltage to be measured is integrated for a fixed time, then the input is switched over to a reference voltage and the time until the output of the integrator returns to zero is counted as a digital quantity. However, in the first mentioned integrating system, it is difficult to obtain stable feedback pulses of a fixed quantity of electric charge. In the latter, there is no such defect and the apparatus can be manufactured at comparatively low cost but an accurate measurement above about 0.01 percent has been so far impossible because of limitations in the accuracy of the attenuator, zero level comparator or any other part.

The present invention has made it possible to eliminate such defects as are described above and to make a measurement very high in the accuracy. That is to say, according to the present invention, the influence of noises of large amplitudes superimposed on the input voltage can be eliminated and the voltage sensitivity can be made high enough without impairing the high resolving power and high accuracy. Further, the measuring time can be reduced without requiring an analog to digital converter and an amplifier of high linearity, nor does the system require a high grade amplifier in which high gain and short settling time is necessary.

Therefore, an object of the present invention is to provide a voltage comparator of a high resolving power and high accuracy.

Another object of the present invention is to provide an apparatus wherein a voltage measurement of a high sensitivity and high accuracy can be made by using an accurately corrected external reference voltage substantially without noise.

A further object of the present invention is to provide a voltage comparator wherein the input resistance can be made high.

A still further object of the present invention is to provide an analog-digital converter which is low cost and is high in the accuracy and sensitivity.

The accompanying drawing is a block diagram showing an embodiment of an apparatus according to the present invention.

Referring to the drawing, the ratio of a voltage to be measured as applied to a terminal 1 and a reference voltage applied to a terminal 20 can be indicated as a digital quantity with a high precision of $10^{-6}$. First of all, when a reset pulse is sent out on wire 8a from a timing pulse generator 8, a counter 17 for the upper four digits, i.e. the most-significant digits, of a reversible counter will be set at "+1000" and at the same time a counter 15 for the lower three digits will be set at "999" and the measurement will be started. Morever the above mentioned reset pulse on wire 8a will be applied to a control logic circuit 7 which will in response thereto deliver an output on wire 7a so that a relay 21 will be connected to a terminal a. Therefore, if the input voltage to be measured at terminal 1 is E, the attenuation degree of an attenuator 2 is 1/R, and the amplification gain of a preamplifier 3 is $A_1$, a voltage of $EA_1/R$ will be applied to an integrating amplifier 4. Said amplifier will start the integration of this input voltage. Morever, since at this moment the memory circuit 18 is in a state of "0000", therefore the voltage divider 10 will send out no output since it has no input. Therefore, the output of adder 19 will be equal to the output of the attenuator 2. Further, in response to the above mentioned reset pulse on wire 8a, the control circuit 7 will send out a signal on wire 7b to enable an upper sample gate 12 which will open so that the output pulses of a clock pulse generator 11, for example, of 50 KHZ will be applied to a add.-sub. control circuit 14. These pulses will at this point in the measuring sequence be applied as subtractive pulses to the four-digit counter 17 so as to reduce in turn the numerical value initially preset at "+1000." That is to say, after 20 milliseconds, the counted value will become "0000" and a first pulse will be sent out of the memory circuit 18 on wire 18a. The control circuit 7 will be driven by this output to deliver an output on wire 7k to reverse the control circuit 14 to make the pulses addative, and further to deliver an output on wire 7a to switch over the relay 21 to connect terminal b to the integrating amplifier. At this point the integration of the above mentioned input voltage $EA_1/R$ has been completed, and the integration of a reference voltage applied to a terminal 20 will be started. This reference voltage is initially selected to be of a polarity reverse to that of the above mentioned input voltage at terminal 1 by a polarity selecting circuit 9, and as a result the output of the integrator 4 will begin to gradually reduce. When the output voltage of said integrator amplifier becomes zero, the zero detector 6 will apply a signal pulse on wire 6a to the control circuit 7 which will deliver short-circuit the integral switch 5 to stop the integrating operation and will at the same time close the gate 12. However, during the time in which the upper sample gate 12 remained open before the zero signal appeared on wire 6a the number of clock pulses in the integrating time of the reference voltage was counted by the upper counter 17. The add-sub. control circuit 14 sent out additive pulses and therefore the counted value was accumulated in the counter 17 as a positive number. That is to say, if the integrating time of the voltage $EA_1/R$ is $T_1$ and the integrating time of the reference voltage $E_S$ is $T_2$, a relation of $$EA_1/R \cdot T_1 = E_S \cdot T_2$$

will hold good. Further, if the output frequency of the clock pulse generator 11 is $f$ and the value when the upper counter 17 is present by the reset pulses, for, 1000 in the above described case, is $n_1$ and the final counted value is $n_2$, $n_1 = fT_1$ and $n_2 = fT_2$. Therefore, if a counting error is assumed and represented by $\Delta E$, there will be a relation of $$\frac{E}{R} = \frac{E_S}{A_1} \cdot \frac{n_2}{n_1} + \Delta E \qquad (1)$$

In the case where the upper counter 17 has four digits, this error term $\Delta E$ will be less than 0.1 percent.

When the above described operation ends, a numeral representing the numerical value $n_2$ will be stored in the memory circuit 18 and a corresponding analog level will be applied to the voltage divider 10. Moreover the zero signal on wire 6a actuates the control circuit 7 simultaneously with the completion of the above mentioned operation, to deliver an output on wire 7to actuate the divider 10 to send out a voltage at an analog level given by $-n_2/n_1 \cdot E_S$ with an accuracy of 0.1 ppm. The divider 10 will apply it to the adder 19. At the signal on wire 6a will actuate the control circuit 7 to switch the same time, the relay 21 over to the terminal a and an output will appear on wire 7f to change the amplification degree of the preamplifier 3 to $A_2$. Further, in response to the zero signal on wire 6a, the control circuit 7 not only closed the upper sample gate 12 but also delivered a signal on wire 7d to open the lower sample gate 13. Therefore, a voltage of $$\frac{E}{R} - \frac{n_2}{n_1} E_S = \Delta E$$

as amplified to be $A_2$ times as large, by the preamplifier 3, will be applied to the integrator 4 which will thus start the integration. Moreover, in response to the zero signal 6a the control circuit sends out a signal on wire 7g setting the control circuit 22 so that, clock pulses will be applied as subtractive pulses to the lower counter 15 through the control circuit 22. Therefore, the value initially set at "999" as described above will gradually reduce. When this value reaches "000" and the next pulse is applied as a second full scale pulse on the wire 16a to the control circuit 7 which will end the above mentioned integrating operation by delivering an output on wire 7a whereby the relay 21 will be switched over to the terminal b the polarity selecting circuit 9 will be so controlled as to apply the reference voltage of the terminal 20 in a polarity reverse to that of the input voltage of the integrator 4. Therefore, the output voltage of the integrator 4 will begin to gradually reduce. In case the above mentioned voltage $\Delta E$ is of the same polarity as of the input voltage, the counted values of the lower counter 15 will be added in turn from "000." In case it is of a different polarity, they will be subtracted. When the output voltage of the integrator 4 has become perfectly zero, the zero detector 6 will send out to the control circuit 7 on wire 6a a signal pulse, and as discussed above, the control circuit 7 will deliver an output on wire 7c whereby the integral switch 5 will short-circuit, and therefore the integrating operation will stop. An output on wire 7d will close the lower sample gate 13 to stop and the counting operation. Therefore, if the time of integrating the value $A_2$ times the above mentioned voltage $\Delta E$ is $T_3$, the integrating time of the reference voltage $E_S$ is $T_4$, the full scale of the lower counter 15 is $n_3$, and the final counted value is $n_4$, then because $n_3 = fT_3$ and $n_4 = fT_4$, $$\Delta E = \frac{E_S \, n_4}{A_2 \, n_3} \quad (2)$$

will hold good and, from the above mentioned formula (1) and this formula (2)

$$\frac{E}{E_S} = R \left( \frac{1}{A_1} \cdot \frac{n_2}{n_1} + \frac{1}{A_2} \cdot \frac{n_4}{n_3} \right) \quad (3)$$

will be obtained. That is to say, in case the total number of digits of the counters 17 and 15 is 7, and for example, if the attenuation degree $1/R$ is made 1, $n_1 = n_3 = 1,000$, $A_1 = 1$ and $A_2 = 1,000$, $E/E_S$ will be $$\frac{E}{E_S} = \frac{n_2}{1000} + \frac{1}{1000} \cdot \frac{n_4}{1000} = \frac{1000 \, n_2 + n_4}{1,000,000}$$

Thus when the digits of the upper counted value $n_2$ and lower counted value $n_4$ are read together as a seven digit numeral, the ratio of the measured voltage and reference voltage will be able to be indicated directly as a digital value of seven figures.

Further, in the above mentioned example, in the case where the voltage divider 10 is formed only of a precision resistance, the accuracy of the individual resistance element will be several ppm. at most as an absolute value of accuracy, but the accuracy as a dividing ratio will be able to be easily made less than 0.1 ppm. Therefore, the objects of the present invention can be easily attained. In such case, the counted value $n_1$ must be made larger than, or at least equal to, the counted value $n_2$. However, when an electric source containing an active element generating a voltage of $n_2 \, E_S \, n_1$ is used, $n_2$ will be able to be made larger than $n_1$. Further, at the same time, the input impedance of the terminal 20 will be so high that the current taken out of the electric source of the voltage $E_S$ will be very low.

Further, the present invention can be applied, for example, to a system wherein the sum of a voltage to be measured and a reference voltage is integrated for a fixed time and is then reversely integrated with only a reference voltage of a reverse polarity, and the time until the output of the integrator becomes zero is determined digitally. It can also be applied to a system wherein the sum of a voltage to be measured and a positive and negative symmetrical clock voltage having a fixed repeating rate such as for example, of a rectangular or triangular wave is integrated and, when the output is positive or negative, the output will be reversely integrated respectively with a negative or positive reference voltage, and the time during which the positive reference voltage is being applied and the time during which the negative reference voltage is being applied during one period are added or subtracted with a reversible counter.

What is claimed is:

1. A voltage comparator for indicating as a multinumeral digital expression the ratio of a first input voltage and a second input reference voltage said expression having most-significant digits and least-significant digits which are mutually related by a scaling factor, comprising, means for integrating the respective input voltages and for determining the ratio of the times required for the voltages to reach equal levels of integration and for expressing the ratio as a digital quantity representing the most-significant digits of said expression, means for multiplying said second input voltage by said ratio to obtain an analog quantity and for obtaining the difference between said analog quantity and said first input voltage to obtain an error value, means for multiplying the error value by said scale factor to obtain an error voltage, means for integrating the respective error voltage and the second input voltage and for determining a second ratio of the times required for the latter voltage to reach equal levels of integration and for expressing the second ratio as another digital quantity representing the least-significant digits of said expression, and means for displaying both digital quantities combined in the same numeral scale to provide said expression.

* * * * *